Figure 5:
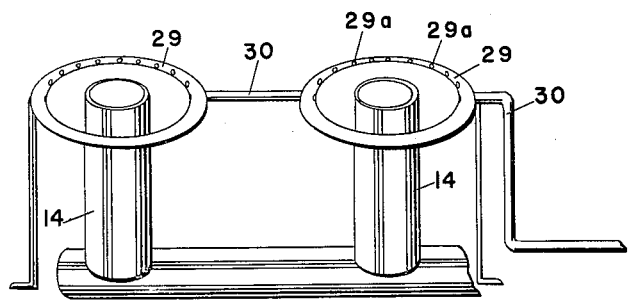

Oct. 16, 1962
C. R. WALKER ETAL
SOLDERING APPARATUS AND METHOD OF
SOLDERING ELECTRICAL CONDUCTORS
3,058,441
Filed Oct. 2, 1956
2 Sheets-Sheet 1
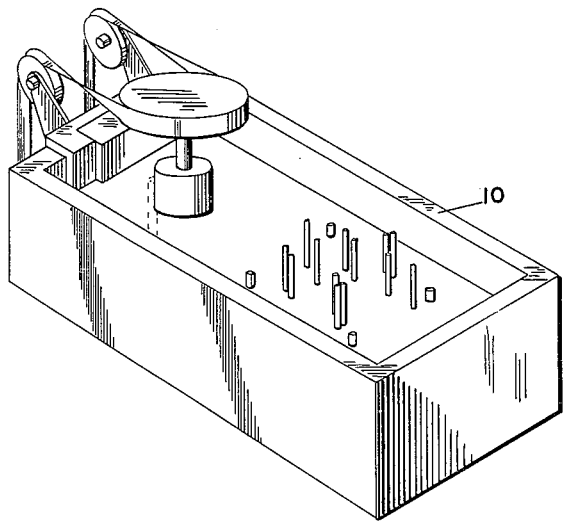
Fig. 1
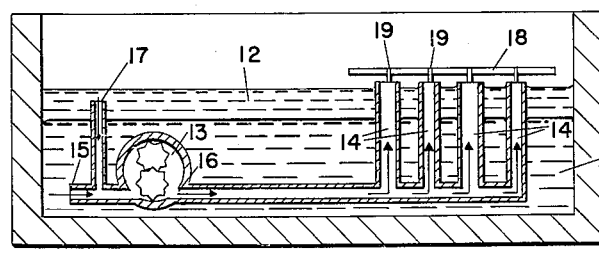
Fig. 3
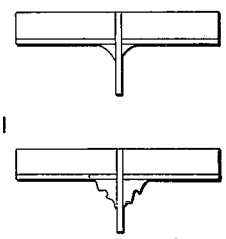
Fig. 2a
Fig. 2b
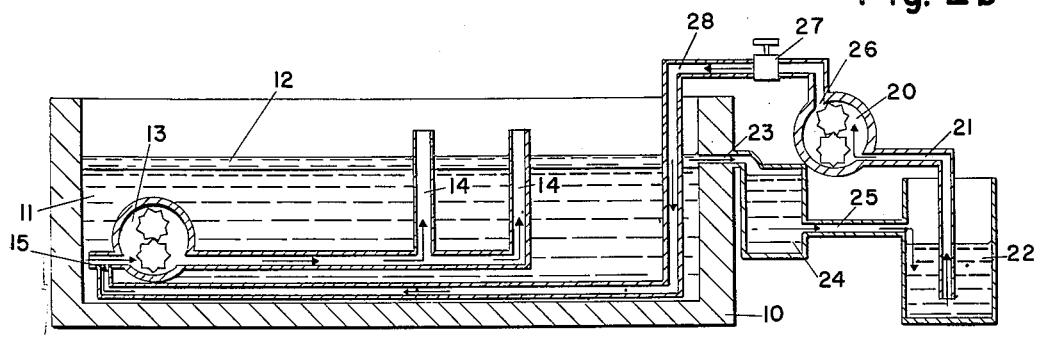
Fig. 4
Clifford R. Walker
&
Arthur F. Goldsby
INVENTORS Clifford R. Walker
&
Arthur F. Goldsby

INVENTORS

United States Patent Office 3,058,441
Patented Oct. 16, 1962

3,058,441
SOLDERING APPARATUS AND METHOD OF SOLDERING ELECTRICAL CONDUCTORS
Clifford R. Walker, Dracut, Mass., and Arthur F. Goldsby, Reeds Ferry, N.H., assignors, by mesne assignments, to Sanders Associates, Inc., Nashua, N.H., a corporation of Delaware
Filed Oct. 2, 1956, Ser. No. 613,429
4 Claims. (Cl. 113—126)

The present invention relates to the art of soldering or joining metal pieces together. More particularly, the present invention relates to a soldering apparatus and a method of soldering electrical conductors.

In the prior art a soldering process known as "dip-soldering" has become widely used. In the dip-soldering process a bath of molten solder is utilized, into which, for example, an entire circuit is immersed simultaneously to effect a plurality of soldered joints. It has been found, however, that such baths quickly become coated with an undesirable film which impedes the soldering process. Where a flat circuit such as a printed circuit is involved, it has been found to be difficult to immerse the joints through the meniscus formed by the molten solder. This, of course, is attributable to the high surface tension of molten solder. Also, in many cases, the points to be soldered are mounted on a board which may be deleteriously affected by the molten solder. In addition, when using conventional dip-soldering an excessive amount of solder is deposited which in no way contributes to the mechanical or electrical joints required. It has thus been found that conventional dip-soldering is subject to a number of undesirable disadvantages.

It is therefore an object of the present invention to provide an improved soldering apparatus and method of soldering which provides high quality solder joints quickly and efficiently.

A further object of the invention is to provide an improved soldering apparatus and method of soldering in which the effective surface tension of molten solder is substantially reduced to promote ready immersion of joints to be soldered.

A still further object of the invention is to provide an improved soldering apparatus and method of soldering in which undesirable oxide coatings of the solder bath are substantially reduced.

A further object of the invention is to provide an improved soldering apparatus and method of soldering wherein a plurality of solder joints may simultaneously be effected without using an excessive amount of solder.

In accordance with the invention there is provided a soldering apparatus. The apparatus comprises a source of molten solder and a source of wetting agent having less density than the solder. Means are provided for coating the solder with the wetting agent to reduce the surface tension of the solder and enable ready immersion of the material to be soldered.

In one embodiment of the invention there is provided a container for a body of molten solder and a layer of liquid, having less density than the solder, floating on the solder. A hollow tube is adapted to be submerged in and extend above the level of the solder. Pump means are provided having an inlet for connection to the solder and an outlet connected to the tube. The pump means and tube are adapted to coat the solder with the liquid when the pump means causes the solder to flow through the tube, whereby a fountain of liquid-coated solder is caused to appear at the open end of the tube extending above the solder.

Further, in accordance with the invention, there is provided a method of soldering. The method comprises providing a body of molten solder, mixing the solder with a wetting agent to provide coated solder and immersing the material to be selected through the coated solder.

For a better understanding of the present invention, together with other and further objects thereof, reference is made to the following description taken in connection with the accompanying drawings and its scope will be pointed out in the appended claims.

Figure 6:
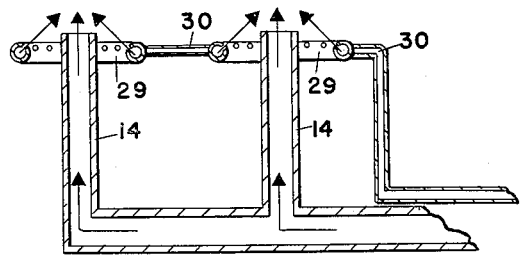
Figure 7:
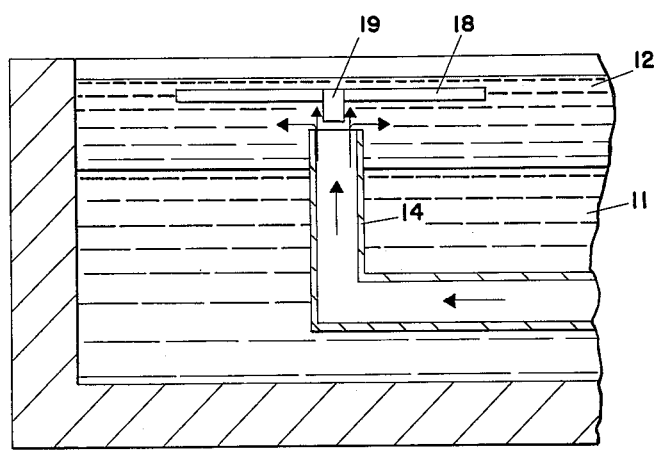

In the drawings:
FIG. 1 is a perspective view of a soldering apparatus embodying the invention;
FIG. 2a is an elevational, sectional, detail view of a soldering joint effected in accordance with the invention; and FIG. 2b is an elevational, sectional, detail view of a solder joint effected in accordance with the prior art practice;
FIG. 3 is a sectional view, partly schematic, of the apparatus in FIG. 1 shown soldering a plurality of connections;
FIG. 4 is a sectional view, partly schematic, of a modification of the apparatus in FIG. 3;
FIG. 5 is a fragmentary, perspective view, of a further modification of the apparatus in FIG. 3;
FIG. 6 is a sectional, elevational view of the apparatus in FIG. 5; and
FIG. 7 is a fragmentary view of still another modification of the soldering apparatus in FIG. 3.

*Description and Operation of the Soldering Apparatus in FIGS. 1, 2 and 3*

Referring now to the drawings and with particular reference to FIGS. 1, 2 and 3, there is here provided a container 10 for molten solder 11 on which a layer of a wetting agent 12 is floated, such as Peblum oil as manufactured by Shell Oil Company. Peblum oil is approximately 85% of an unfiltered HVI (high viscosity index) Bright stock having a viscosity of about 200 Saybolt Universal Seconds at 210° F., 0.5% phenyl-alpha-naphthylamine, and the remainder a mixture of fatty acid material about one-half of which is hydrogenated marine oil distillate and one-half unsaturated fatty acid. Additional information regarding compositions of this type may be found in U.S. Patent No. 2,537,882 of George W. Waters, assigned to Shell Development Company. The wetting agent must be a relatively inert oil, such as Peblum oil, and liquid from below room temperature, 68° F., to temperatures in excess of solder bath, 475° F. The wetting agent 12 may be mixed with 5 to 30 percent of a conventional soldering resin flux, such as Kester Types 1544, 1545, 1546 and 1547. A solder flow control means is provided and here includes a pump 13 and a plurality of hollow tubes 14. The pump 13 has an inlet 15 for connection to the solder and an outlet 16 connected to soldering tubes 14. Another inlet 17 is connected to the wetting agent 12. The tubes 14 are immersed in the solder and extend not only above the level of the solder but above the level of the wetting agent as well. The solder 11 is maintained molten by a suitable source of heat, not shown, which passes, for example, through the container 10. A plurality of joints to be soldered, for example, the connections on a printed circuit panel 18, having a plurality of conductors 19 disposed in a predetermined configuration, are shown in position for soldering.

*Operation*

This embodiment of the invention is characterized as a "fountain soldering" apparatus. The container 10 as indicated above is heated to maintain the solder 11 in a molten condition. The wetting agent 12, which may comprise Peblum oil or a fusible resin that is capable of withstanding a sufficiently high temperature, floats on the upper surface of the solder 11. The pump 13 collects solder through the inlet 15 and the wetting agent through the inlet 17 and pumps the two liquids through the outlet 16 connected to the tubes 14. The pattern of disposition of the tubes is chosen to coincide with that of the joints 19 to be soldered. The wetting agent 12 and the solder 11 are mixed in the pump 13 in proportions varying from 10 to 50 parts per hundred of holder, the proportion being determined, for example, by the relative sizes of the inlets 15 and 17. The mixture of solder and wetting agent is caused by the action of the pump 13 to flow through the outlet 16 to the tubes 14 in parallel and out of the open ends of the tubes 14 to provide a fountain of wetting-agent-coated solder. A soldering joint thus obtained is illustrated in FIG. 2a. It will be apparent that such a joint is much smoother than the prior art joint illustrated in FIG. 2b. The layer of oil or wetting agent 12 floating on the surface of the molten solder 11 tends to protect the solder from prematurely oxidizing and becoming coated with an undesirable film. As noted above, the fluxing action to clean the joint may be simultaneously effected with the wetting action of the wetting agent by mixing the two.

While applicant does not intend to be limited to any particular shapes or sizes of parts in the embodiment of the invention just described, there follows a set of sizes and dimensions for the more important components which have been found to be particularly suitable for a soldering apparatus for the type represented in FIGS. 1 and 3. Thus, the temperature of the solder body is 425–475° F. The solder preferably consists of a mixture of 63% tin and 37% lead, or 63% tin, 33% lead and 4% silver. The tubes are 3/16″ in diameter and 2″ long. The diameter of the pump outlet 15 is 1/2″ and preferably 1″ or less long. The volume of the solder bath is 300 cubic inches, while the layer of wetting agent 12 is 1 to 1 1/2″ high. The solder is caused to flow at the rate of 1 to 2 gallons per minute, requiring a pump of the positive displacement type as manufactured by Hayes Pump and Machine Company, 100 Vine Street, Somerville, Massachusetts. The wetting agent 12 may be made available in a separate external reservoir. The overflow of wetting agent may then be gathered through a suitable opening in the walls of the container 10. It turns out that the solder flowing from the open ends of the tubes 14 exist in the form of small globules which are coated with the wetting agent. The globules immediately upon contact with the joints 19 break down and permit the free flowing of solder to occur.

*Description and Operation of the Soldering Apparatus Presented in FIGS. 4–7*

In the embodiment of FIG. 4, a separate external, pump 20 is utilized for the wetting agent. Since the embodiment of FIG. 4 is similar to that of FIG. 3, like parts are here represented by identical reference numerals. The pump 20 is coupled through an inlet pipe 21 to a reservoir 22. The wetting agent 12 is coupled through a port 23 in the wall of the container 10 to a filter 24. The filter 24 is coupled through a conduit 25 to the reservoir 22 as shown. The pump 20 is coupled through an outlet 26 to a petcock 27 and, thence, through a conduit 28 to the inlet 15 of the pump 13. Locating the pump 20 externally to the solder bath 11 in the manner of this embodiment provides an extra degree of freedom in the control of the wetting agent not available in the embodiment of FIG. 3. Here the wetting agent is pumped through the inlet 15 of the pump 13, mixed with the molten solder and passed through the tubes 14 to provide a fountain of solder mixed with the wetting agent at the openings of the tubes 14.

In the embodiment of FIGS. 5 and 6, the molten solder is pumped through the tubes 14 as described and shown above. The wetting agent is introduced through a perforated ring 29, from a separate source through the conduit 30. The ring 29 is disposed adjacent the open end and the perforations 29a are so oriented as to provide a cone-shaped stream of wetting agent above the open end of the tubes 14. Introducing the wetting agent in the manner of FIGS. 5 and 6 enables an independent control of the wetting agent. When the wetting agent is mixed with the molten solder in the manner of the embodiment of FIG. 1, there is an upper limit of the amount of wetting agent that can be introduced. In the embodiments of FIGS. 5 and 6 the amount and temperature of the wetting agent at the time it is introduced is substantially independent of the molten solder.

In the embodiment of FIG. 7, the wetting agent 12 is statically supported above the layer of molten solder 11. The solder is pumped through the tubes 14 and the joint 19 in the printed circuit panel is immersed in the oil in contact with the solder. This embodiment is useful when immersing the printed circuit panel in the oil is not harmful.

While there has been described what is at present considered to be the preferred embodiment of this invention, it will be obvious to those skilled in the art that various changes and modifications may be made therein without departing from the invention, and it, therefore, is aimed in the appended claims to cover all such changes and modifications as fall within the true spirit and scope of the invention.

What is claimed is:

1. A soldering apparatus comprising: a container having molten solder therein with a layer of wetting agent thereover, said liquid being relatively inert and remaining in its liquid state at temperatures from below 68° F. to temperatures in excess of that of said molten solder, said wetting agent having a density less than that of said molten solder so as to float thereon; and a pump means having an inlet communicating with the solder below the wetting agent and another inlet communicating with the wetting agent above the solder, said pump means having a discharge opening therein for discharging a mixture of said solder and wetting agent, a soldering fountain adapted to communicate with components thereover to be soldered, said fountain being connected to said discharge opening for directing said mixture of solder and wetting agent on said components.

2. A soldering apparatus comprising: a container of molten solder having a layer of Peblum oil thereover; and a pump means having an inlet communicating with the solder below the Peblum oil and another inlet communicating with the oil above the solder, said pump means having a discharge opening therein for discharging a mixture of solder and Peblum oil, a soldering fountain adapted to communicate with components placed thereover to be soldered, said fountain being connected to said discharge opening for directing said mixture of solder and Peblum oil on said components.

3. A soldering apparatus comprising: a container of molten solder having a layer of liquid wetting agent thereover, said wetting agent being relatively inert and remaining in its liquid state at temperatures from below 68° F. and temperatures in excess of that of said molten solder, said wetting agent having a density less than that of said solder so as to float thereon; and a pump means having an inlet communicating with the solder below the wetting agent and another inlet communicating with the wetting agent above the solder, said pump means having a discharge opening therein for discharging a mixture of solder and wetting agent, a plurality of soldering fountains adapted to communicate with components placed thereover to be soldered, said fountains being connected to said discharge opening for directing said mixture of solder and wetting agent on said components.

4. A soldering apparatus, comprising: a container of molten solder and a layer of wetting agent floating on said solder; a hollow tube partially submerged in and extending above the level of said solder and said oil; a first pump means having an inlet connected to said solder and an outlet connected to said tube for pumping molten solder through said tube; and a second pump having an inlet connected to said wetting agent and an outlet connected to said tube to coat said solder with said wetting agent when said first pump means causes said solder to flow through said tube, whereby a fountain of wetting agent-coated solder is caused to appear at the open end of said tube extending above said solder and oil, said open end being adapted to communicate with components placed thereover to be soldered.

References Cited in the file of this patent

UNITED STATES PATENTS

| | | |
|---|---|---|
| 1,446,667 | Schulz | Feb. 27, 1923 |
| 1,704,539 | Karmazin | Mar. 5, 1929 |
| 2,321,071 | Ehrhardt et al. | June 8, 1943 |
| 2,389,175 | Woods | Nov. 20, 1945 |
| 2,583,267 | Jones et al. | Jan. 22, 1952 |
| 2,671,264 | Pessel | Mar. 9, 1954 |
| 2,771,049 | Fish | Nov. 20, 1956 |
| 2,870,532 | Young | Jan. 27, 1959 |